United States Patent [19]

Wolfram

[11] Patent Number: 5,051,565
[45] Date of Patent: Sep. 24, 1991

[54] BAGGAGE AND PASSENGER MATCHING METHOD AND SYSTEM

[75] Inventor: John R. Wolfram, Cocoa Beach, Fla.

[73] Assignee: Johnson Service Company, Milwaukee, Wis.

[21] Appl. No.: 485,322

[22] Filed: Feb. 26, 1990

[51] Int. Cl.⁵ ............................................. G07B 15/02
[52] U.S. Cl. .................................. 235/384; 235/375; 235/376
[58] Field of Search ...................... 235/375, 376, 384; 364/401, 463, 407

[56] References Cited

U.S. PATENT DOCUMENTS 4,711,994 12/1987 Greenberg ......................... 235/384

*Primary Examiner*—Harold Pitts
*Attorney, Agent, or Firm*—Duckworth, Allen, Dyer & Doppelt

[57] ABSTRACT

A system and method for matching all loaded baggage with passengers during aircraft boarding provides each passenger with a boarding pass and baggage tags, each having the same unique machine readable code imprinted thereon. A scanner and memory device at the boarding point scans and reads a passenger's pass and stores the code. A portable scanner and memory at the baggage loading point scans and reads each luggage tag and stores each code. The stored codes are delivered to the passenger loading gate prior to departure of the aircraft. A computer compares stored passenger codes with stored baggage codes. Lack of a stored loading pass code with a matching stored code of loaded baggage is indicated to permit inspection of such baggage prior to aircraft departure.

3 Claims, 3 Drawing Sheets

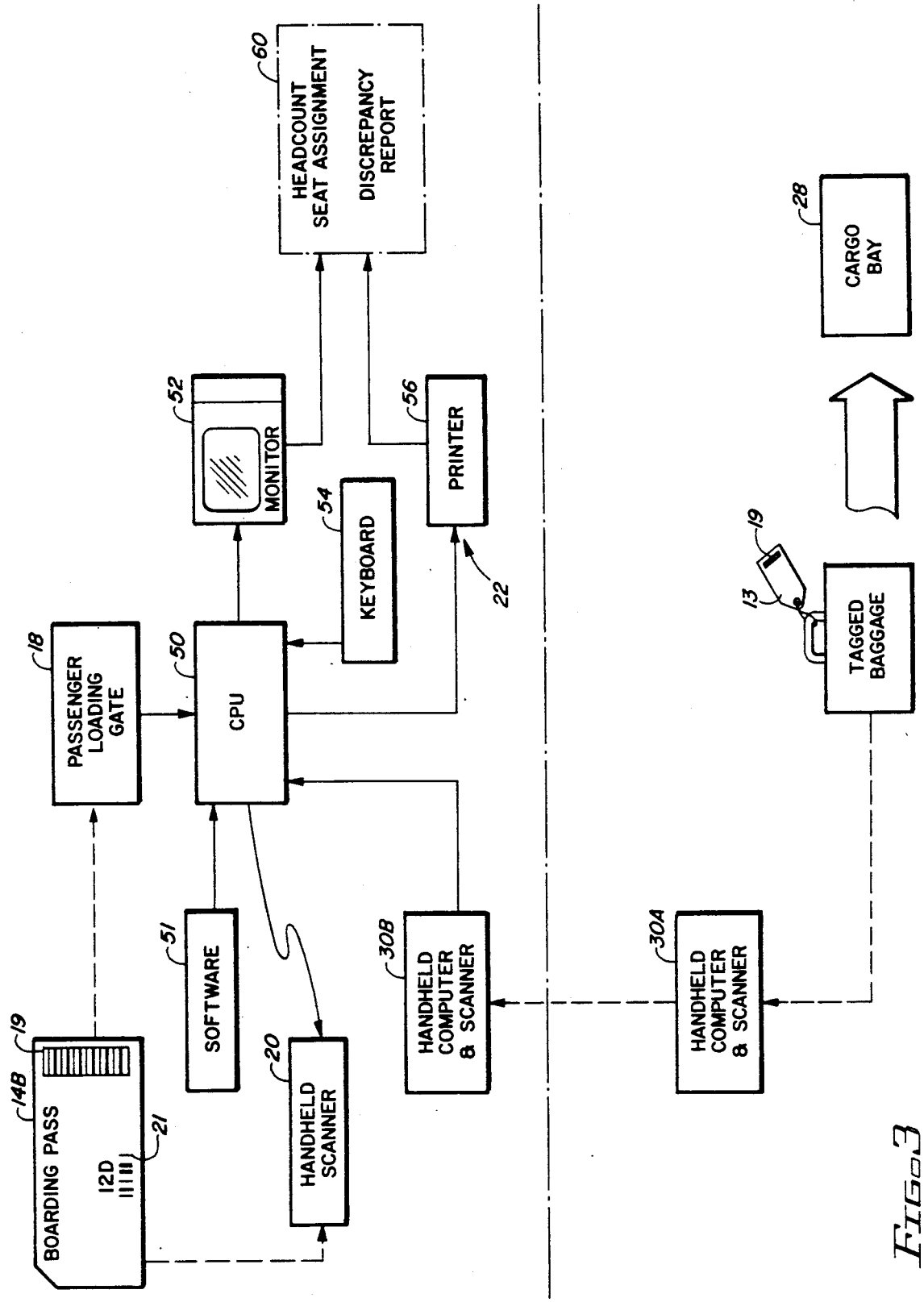

BAGGAGE AND PASSENGER MATCHING METHOD AND SYSTEM

BACKGROUND OF THE INVENTION

1. Field of the Invention

The present invention relates to transportation systems in which passengers have separately handled baggage, and more particularly to a system for assuring that a passenger who checks luggage boards the transport.

2. Description of the Prior Art

Recent Federal Aviation Commission rules require that baggage not be transported on an airline flight unless the passenger who checked the baggage is enplaned on the same aircraft. The purpose of such regulation is to discourage terrorist attacks in which a person checks luggage having explosive materials, but does not board the aircraft. To require matching of luggage with passengers at the loading gate before loading of the luggage into the aircraft would result in extensive departure delays, and additional expense. Thus, there is a need for a fast, essentially foolproof method of matching passengers with stowed luggage which will assure that the passengers have boarded the aircraft without disturbing existing check-in and boarding procedures.

One approach to this problem is provided by Greenberg, U.S. Pat. No. 4,711,994 which utilizes the airplane ticket and luggage tag to provider matching. All tickets are preprinted with a machine readable unique number printed thereon. All baggage tags have a different unique number printed thereon. The tags and tickets are scanned at check in, and linked together by a computer. All passengers are boarded and the tickets surrendered. The ticket code for each passenger is then matched with the checked luggage of each passenger. Next, the baggage of all properly matched codes is then loaded in the cargo bay of the aircraft. This approach delays the aircraft departure after loading of passengers until the luggage has been loaded.

SUMMARY OF THE INVENTION

The present invention is a system and method for: matching all loaded luggage with passengers during boarding; immediately identifying luggage checked by persons who have not boarded; confirming that persons checking in for a flight actually have boarded the aircraft; providing a running check to airline personnel of seat selection and head count; and errors or duplication of seat assignment.

A passenger, who may be pre-ticketed or purchasing a ticket, arrives at a check-in position. The agent issues a boarding pass which is inserted into a printer which codes the ticket with typed seat number and a machine coded representation of the seat number, received from the airline computer. A video camera system records a video frame of the passenger's face and prints out an instant photograph of the frame on an adhesive label. The agent attaches the photograph to the boarding pass.

Baggage tags are prepared for all checked luggage. Adhesive labels which may be preprinted or produced by a local printer, have a machine readable code thereon unique to the passenger, and are attached to the boarding pass and to each baggage tag. When preprinted labels are used, dual rolls having duplicated codes may be used, with one placed on the boarding pass and one on a luggage tag. Thus, a boarding pass may have more than one uniquely coded labels attached thereto. Any type of machine readable code may be used; for example, standard bar codes.

The passenger proceeds to the passenger loading gate, presenting his boarding pass to the agent. A computer, separate from the airline reservation competer, has a handheld scanner used to scan a coded lable on the boarding pass which stores that identification in its memory. The agent also visually checks the boarding pass photograph to verify that the correct passenger is boarding. The boarding computer includes a keyboard, monitor and printer.

The luggage from check-in is delivered to the cargo bay (or to a container loading station) where baggage personnel scan each luggage tag with a handheld computer and scanner. Thus, each piece of luggage has its code stored in the handheld computer memory. The handheld computer may include a keyboard for entering the cargo hold or container identification for each piece of luggage to permit rapid access if it becomes necessary to inspect a suspected piece.

After baggage loading is completed, the ground worker carries the handheld computer to the gate agent who plugs it into the boarding computer. The codes from the loaded luggage is read into the computer memory which is programmed to compare the codes with the boarded passenger codes. If all luggage is matched with a passenger, the aircraft is ready for departure. If luggage is identified for which the corresponding passenger code is not found, departure is held up and such baggage is located and removed for inspection.

The results of passenger loading is continuously displayed on the computer monitor to permit detection of any assignment errors, open seats, and head count. The passenger list can be printed out after loading is complete. If there are any discrepancies in passenger or baggage records, a report is displayed and printed out.

It is therefore a principal object of the invention to provide a method and system to ensure that all passengers checking luggage are on the aircraft before departure.

It is another object of the invention to provide a system for coding passenger boarding passes and corresponding baggage tags to permit matching of loaded luggage with loaded passengers.

It is still another object of the invention to provide a system for attaching a machine readable coded label to a boarding pass and a correspondingly coded label to checked luggage.

It is yet another object of the invention to provide a computerized system for comparing boarding pass coded labels with luggage coded labels to produce detection of loaded luggage in which the passenger check such luggage has not boarded the aircraft.

It is another object of the invention to provide a computer at an aircraft loading gate for displaying loaded passengers and corresponding seat assignments.

These and other objects and advantages will become apparent from the following detailed description when read in conjunction with the drawings.

BRIEF DESCRIPTION OF THE DRAWINGS

FIG. 3 is a more detailed block diagram of the loading gate and cargo bay portion of the system of FIG. 1.

DETAILED DESCRIPTION OF THE PREFERRED EMBODIMENT

Figure 1:
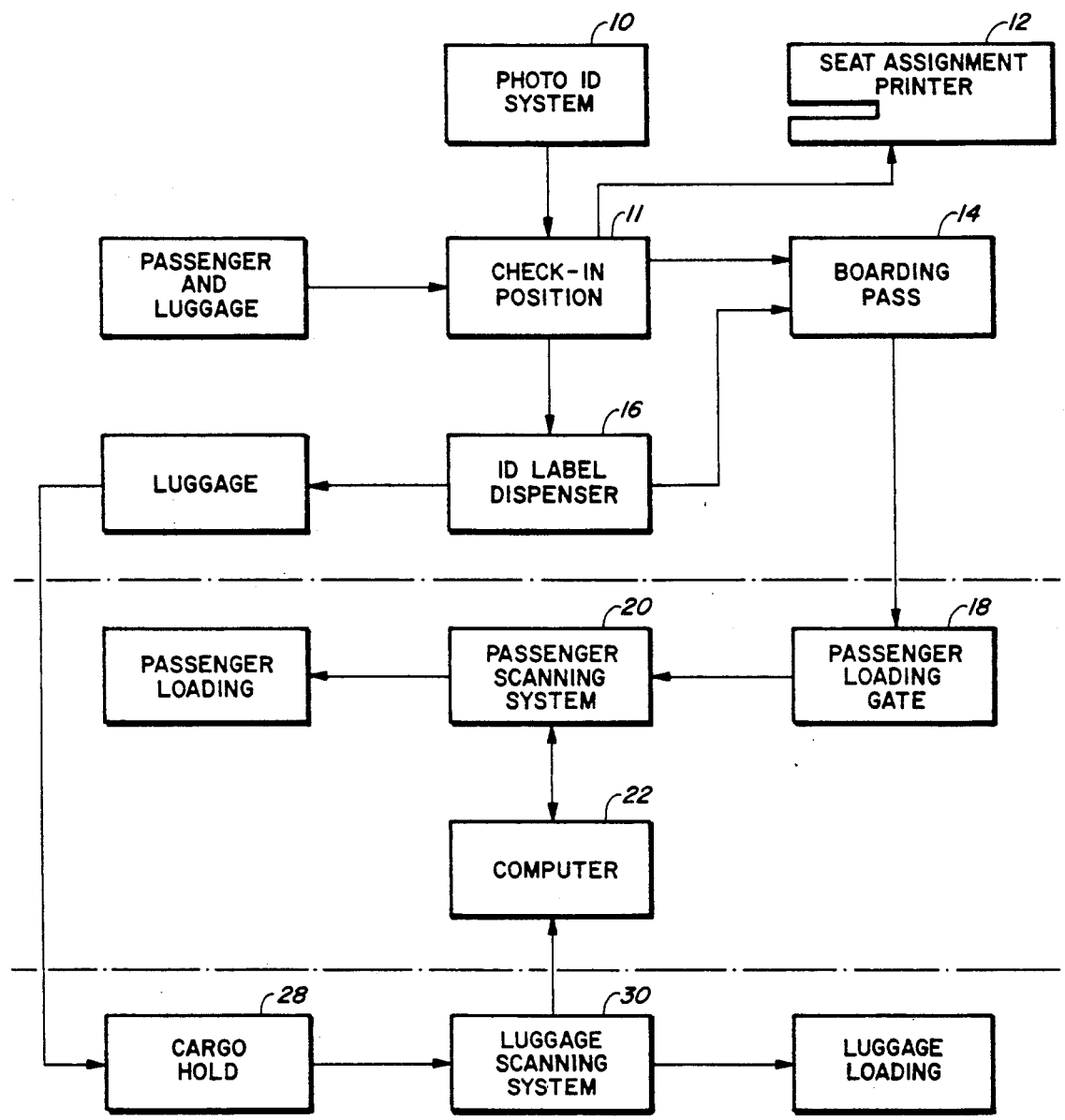
FIG. 1 is a flow chart representation of the method and system of the invention.

Referring to FIG. 1, an overall view of the system and method of the invention for detecting the failure of a passenger checking luggage to enplane is shown. At the airline check-in position 11, a passenger reports with luggage and purchases a flight ticket, or presents a previously purchased ticket. The ticket agent produces an adhesive-backed paper photograph of the passenger by means of photo identification system 10. The agent prepares a boarding pass 14 and attaches the photograph thereto. The boarding pass has a seat assignment printed thereon by printer 12 along with a machine readable code representative of the seat assignment.

A pair of adhesive labels is supplied by dispenser 16 wherein each of the pair of labels has the same unique machine readable code. One label is attached to boarding pass 14, thus being representative of the individual passenger, and the other label is attached to the luggage tag for attachment to one piece of that passenger's luggage. If the passenger has more than one piece of luggage, additional pairs of labels are dispensed and attached to the pass 14 and the additional luggage tags. The tagged luggage is then sent to the cargo hold 28.

The passenger carries the boarding pass 14 to the passenger loading gate 18 when has a stand-alone computer 22 and scanning system 20. The gate agent checks pass 14 by scanning and storing the machine readable code in the memory of computer 22. The agent also visually compares the photograph of pass 14 with the passenger. If a question as to the passenger's identity is found, airport security may be called.

A portable luggage scanner/computer system 30 is provided at the cargo hold 28. Ground personnel scan each luggage label to store each machine readable code in a memory of scanning system 30. After all luggage is scanned and loaded, a ground worker hand carries the portable system to the loading gate 18. The agent connects the scanning system 30 to computer 22 and transfers the recorded and stored luggage codes thereto. A program in computer 22 compares the luggage codes to the boarding pass codes to attempt to match all luggage with a boarded passenger. If any discrepancy is found, computer 22 produces an alarm or report.

Figure 2:
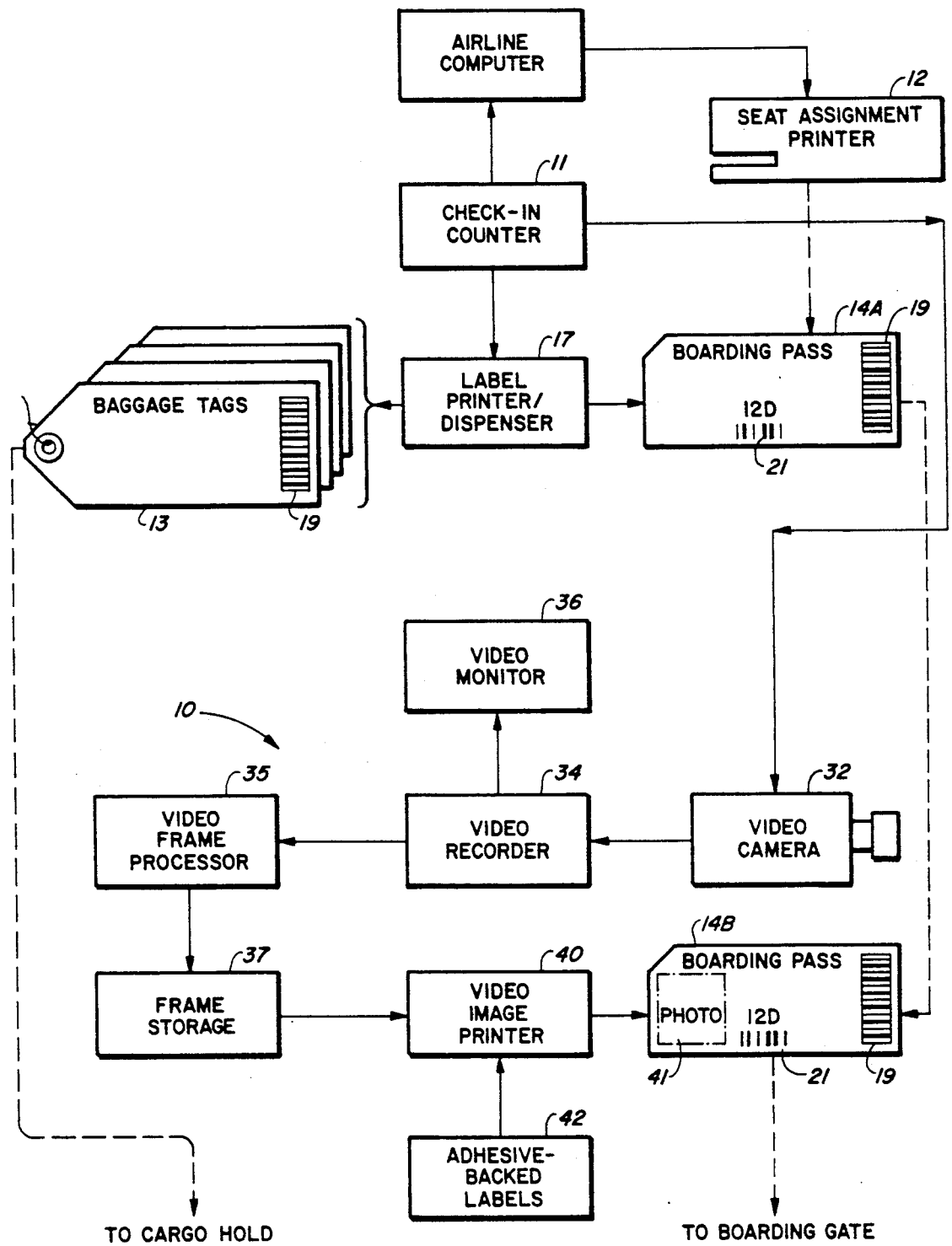
FIG. 2 is a more detailed block diagram of the check-in counter of the system of FIG. 1.

Turning now to FIG. 2, details of the system of the invention located at check-in counter 11 are shown. A boarding pass 19 is issued to the passenger at check-in counter 11. During the check-in procedure, the agent dispenses an adhesive-backed label 19 from dispenser 17, which can be pre-printed or printed by a label printer portion of dispenser 17. In one embodiment of the invention, pre-printed labels 19 are stored in dispenser 17 in pairs as described above, in which case a pair is dispensed for each piece of luggage being checked. When dispenser 17 includes a label printer, the same code may be imprinted on a plurality of labels such that each piece of luggage will have the same ID code.

In the first case, all labels 19 placed on luggage tags 13 have the duplicate placed on the boarding pass 14A. After the airline computer is accessed to assign a seat to the passenger, the selected seat number 21 is printed on pass 14A by seat assignment printer 12 along with a machine readable code representative of the seat number. Alternatively, pre-printed seat assignment number and code labels may be used which are manually applied to pass 14A.

During the passenger check-in procedure, an optional passenger identification procedure may be utilized. A video camera 32 is used to record a full-face view of the passenger by recorder 34. Video frame processor 35 includes a frame grabber which stores a representative frame, as seen on video monitor 36, in frame storage 37. A supply of paper, adhesive-backed lables 42 is provided to permit a photo of the passenger to be made by video image printer 40. The passenger agent attaches finished photo 41 to boarding pass 14B, which now includes passenger ID label 19 and seat number label 21.

At this point, the passenger proceeds to the passenger loading gate 18. The gate agent takes boarding pass 14B from the passenger. If a photo 41 is provided on pass 14B, the agent may verify that the person checking in is at the gate. Using a handheld scanner 20 connected to CPU 50, the gate agent scans label 19, and seat assignment 21 if present. Software 51 in with CPU 50 stores the passenger code or codes, and the seat assignment in the CPU memory. Where the seat assignment system is used, the software 51 verifies that no other passenger is aboard having that assignment. Any problem will be displayed on monitor 52. Thus, a running head count and seat availability of discrepancy 60 is available to the agent.

In the meantime, each passenger's checked luggage is transported to cargo bay 28. In cases in which luggage is containerized, it is to be understood that the same procedure to be described will be followed. The ground worker utilizes handheld, battery-operated, computer and scanner 30A to scan each label 19 on luggage tag 13 as its luggage is loaded into cargo bay 28. The code read from each tag is stored in a temporary memory of computer-scanner 30A. As will be understood, when loading of all luggage is complete, computer/scanner 30A will have a stored ID code for each piece of stored luggage. Computer/scanner 30 may also include a keyboard to permit the ground worker to enter a code for the location of the stowed luggage, such as cargo hold section or container ID.

After closing of baggage loading, the worker carries computer-scanner 30A up the bridge ladder to loading gate 18, turning it over the the gate agent. Now designated 30B in FIG. 3, the unit is temporarily connected to CPU 50, and the stored ID codes transferred thereto. Software 51 controls CPU 50 to pair up each ID code with a stored passenger code. If a match is found for each and every code, then it has been verified that all passengers checking luggage have boarded the aircraft. If any luggage code is not matched, a discrepancy report 60 is displayed on monitor 52. The loaded baggage can be removed for inspection with minimum delay. If explosive devices, or other illegal material, the identity of the passenger checking the baggage may be determined from the cross checking the seat number with the airline computer 15 (FIG. 1). The name used, as well as the stored photograph may be of assistance to law enforcement authorities.

The system and method of the invention has been disclosed as applied to passengers and baggage of airlines. However, the invention is equally applicable to other transport systems, such as bus lines, railroads, and ship lines. Similarly, the hardware disclosed has been for exemplary purposes only, and many variations therein will occur to those of skill in the art without departing from the spirit and scope of the invention.

I claim:

1. A system for matching the identity of a passenger boarding a public transport with check-in luggage comprising:
   a transport boarding pass;
   at least one luggage tag for attachment to luggage to be checked;
   at least two labels, each having the same unique machine readable code imprinted thereon, one of said labels attached to said boarding pass, and the other one attached to said luggage tag;
   first scanning and storing means at a transport loading point for scanning the machine readable code of said boarding pass as the passenger boards, and storing said pass code;
   second scanning and storing means at a transport baggage loading point for scanning the machine readable code of said luggage tag, and storing said tag code;
   means for comparing and attempting to match the stored boarding pass code with the stored luggage tag code;
   means for indicating presence of a lack of a stored boarding pass code with the same code as a stored luggage tag code; and
   a video photograph identification system for producing a paper photographic print of a passenger for attachment to said boarding pass.

2. The system as defined in claim 1 in which said identification system includes:
   a video camera;
   a video frame proocessor and storage;
   a video image printer, and
   adhesive-backed labels for printing of said photographic print.

3. The system as defined in claim 2 which further includes a video recorder.

* * * * *